United States Patent
Nielson et al.

(10) Patent No.: US 11,435,512 B2
(45) Date of Patent: Sep. 6, 2022

(54) HIGH INDEX, CURVED CAP WIRE GRID POLARIZER

(71) Applicant: Moxtek, Inc., Orem, UT (US)

(72) Inventors: R. Stewart Nielson, Pleasant Grove, UT (US); Bradley R. Williams, Pocatello, ID (US)

(73) Assignee: Moxtek, Inc., Orem, UT (US)

( * ) Notice: Subject to any disclaimer, the term of this patent is extended or adjusted under 35 U.S.C. 154(b) by 295 days.

(21) Appl. No.: 16/919,664

(22) Filed: Jul. 2, 2020

(65) Prior Publication Data

US 2021/0018670 A1    Jan. 21, 2021

Related U.S. Application Data

(60) Provisional application No. 62/875,093, filed on Jul. 17, 2019.

(51) Int. Cl.
  *G02B 5/30*    (2006.01)
(52) U.S. Cl.
  CPC .......... *G02B 5/3058* (2013.01); *G02B 5/3075* (2013.01)
(58) Field of Classification Search
  CPC ...................... G02F 1/133548; G02B 5/3058
  See application file for complete search history.

(56) References Cited

U.S. PATENT DOCUMENTS

| | | | |
|---|---|---|---|
| 6,243,199 B1 | 6/2001 | Hanson et al. | |
| 6,532,111 B2 | 3/2003 | Kurtz et al. | |
| 6,665,119 B1 | 12/2003 | Kurtz et al. | |
| 7,570,424 B2 | 8/2009 | Perkins et al. | |
| 7,961,393 B2 | 6/2011 | Perkins et al. | |
| 9,360,608 B2 | 6/2016 | Takahashi et al. | |
| 9,632,224 B2 | 4/2017 | Nielson et al. | |
| 10,649,121 B2 | 5/2020 | Li et al. | |
| 2007/0087549 A1* | 4/2007 | Yamaki | G02B 5/3058 438/613 |
| 2015/0015948 A1* | 1/2015 | Takada | G02B 5/3058 216/2 |
| 2019/0271803 A1 | 9/2019 | Gao | |
| 2020/0174173 A1 | 6/2020 | George | |

* cited by examiner

*Primary Examiner* — Angela K Davison
(74) *Attorney, Agent, or Firm* — Thorpe, North & Western, LLP

(57) ABSTRACT

Each wire of a wire grid polarizer (WGP) can include the following layers moving outwards from the substrate: a high-index-layer, a low-index-layer, and a reflective-layer. Each wire can have a distal-end, farthest from the substrate, with a convex shape. These layers and the convex shape can be combined for a more stable and improved Rs.

20 Claims, 2 Drawing Sheets

US 11,435,512 B2

HIGH INDEX, CURVED CAP WIRE GRID POLARIZER

CLAIM OF PRIORITY

This application claims priority to U.S. Provisional Patent Application No. 62/875,093, filed on Jul. 17, 2019, which is incorporated herein by reference.

FIELD OF THE INVENTION

The present application is related generally to wire grid polarizers.

BACKGROUND

A wire grid polarizer (WGP) can divide light into two different polarization states. One polarization state can primarily pass through the WGP and the other polarization state can be primarily absorbed or reflected. The effectiveness or performance of WGPs is based on high transmission of a predominantly-transmitted polarization (sometimes called Tp), minimal transmission of an opposite polarization (sometimes called Ts), and a desired reflection of the opposite polarization (sometimes called Rs). Contrast (Tp/Ts) is a useful indicator of WGP performance.

If the reflected light beam will be used, it can be helpful to have high reflectance of the opposite polarization (e.g. high Rs). For a reflective WGP, high Rs is desirable and efficiency (Tp*Rs) is a useful indicator of WGP performance. If the reflected light beam is not used, and if reflected light will interfere with the optical system, it can be helpful to have low Rs. Due to difficulty in manufacturing nanometer-sized wires, there can be excess variation in Rs between wafers or even within each wafer. It would be beneficial to reduce such variation.

SUMMARY

It has been recognized that it would be advantageous to improve wire grid polarizer (WGP) performance and to reduce variation of Rs. The present invention is directed to various embodiments of WGPs that satisfy these needs.

The WGP can comprise an array of wires on a face of a substrate with channels between adjacent wires. Each wire can include the following layers moving outwards from the substrate: a high-index-layer, a low-index-layer, and a reflective-layer.

BRIEF DESCRIPTION OF THE DRAWINGS

Drawings Might not be Drawn to Scale

DEFINITIONS

Figure 1:
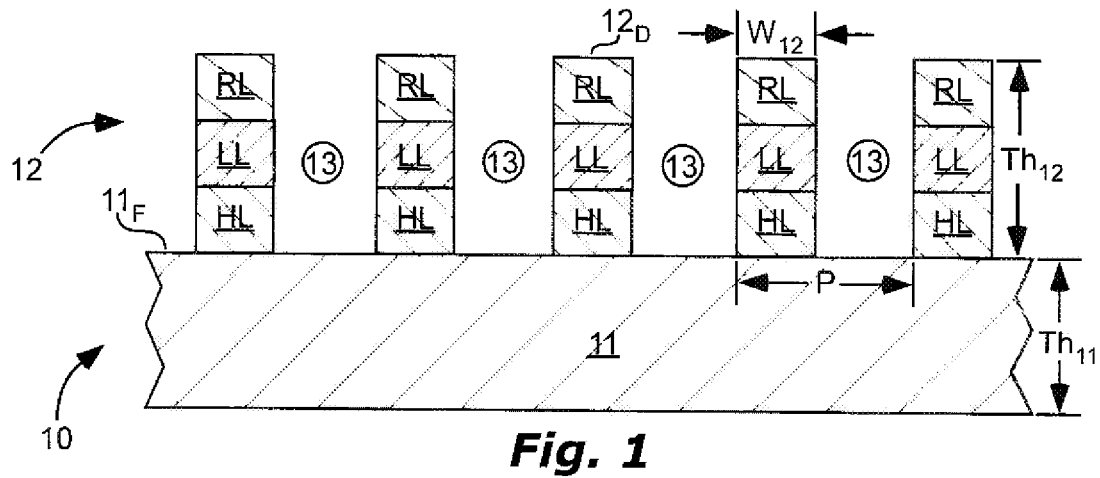
FIG. 1 is a schematic, cross-sectional side-view of a wire grid polarizer (WGP) 10 comprising an array of wires 12 on a face $11_F$ of a substrate 11; each wire 12 including a high-index-layer HL, a low-index-layer LL, and a reflective-layer RL; in accordance with an embodiment of the present invention.

The following definitions, including plurals of the same, apply throughout this patent application.

The metal oxides listed herein include combinations of the metal and oxygen in any ratio, including non-stoichiometric combinations.

Unless explicitly noted otherwise herein, all n&k values (real part of the refractive index n and extinction coefficient k) are such value across a wavelength range from 450 nm through 700 nm.

As used herein, the phrase "consists essentially of", and related phrases, with regard to wire structure, mean that the wire includes the thin film(s) mentioned, but no other thin film(s) for optical performance. The wire can, however, also include impurities, or coatings for protection such as from corrosion or oxidation. Substrate ribs beneath the wires 12 are not included in the wire for the purpose of this definition.

As used herein, the term "elongated" means that a length L (into the sheet of the figures and perpendicular to wire width $W_{12}$ or wire thickness $Th_{12}$) of the wires 12 is substantially greater than wire width W or wire thickness $Th_{12}$ (e.g. L can be ≥10 times, ≥100 times, ≥1000 times, or ≥10,000 times larger than wire width $W_{12}$ and/or wire thickness $Th_{12}$). See FIG. 1.

As used herein, the term "nm" means nanometer(s).

As used herein, the terms "on", "located on", "located at", and "located over" mean located directly on or located over with some other solid material between. The terms "located directly on", "adjoin", "adjoins", and "adjoining" mean direct and immediate contact.

As used herein, the term "parallel" means exactly parallel, parallel within normal manufacturing tolerances, or nearly parallel, such that any deviation from exactly parallel would have negligible effect for ordinary use of the device.

As used herein, the term "substrate" means a base material, such as for example a glass wafer. The substrate can be thick in an optical sense, meaning substantially thicker than a maximum wavelength of light in the wavelength range of use, if explicitly so stated in the claims. For example, a thickness $Th_{11}$ of the substrate can be ≥0.1 mm, ≥0.35 mm, or ≥0.6 mm.

As used herein, the term "ultraviolet spectrum" means 10 nm & <400 nm, the term "visible spectrum" means ≥400 nm & <700 nm, and the term "infrared spectrum" means ≥700 nm & ≤1 mm.

As used herein, the term "refractive index" means the real part of the refractive index (n), and the term "extinction coefficient" means the imaginary part of the refractive index (k).

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a wavelength range of intended use, across the ultraviolet spectrum, across the visible spectrum, across the infrared spectrum, or combinations thereof, and can have a different property in a different wavelength range. Thus, whether a material is absorptive, reflective, or transparent is dependent on the intended wavelength range of use. Materials are divided into absorptive, reflective, and transparent based on reflectance R, the real part of the refractive index n, and the imaginary part of the refractive index/extinction coefficient k. Equation 1 is used to determine the reflectance R of the interface between air and a uniform slab of the material at normal incidence:

$$R = \frac{(n-1)^2 + k^2}{(n+1)^2 + k^2} \quad \text{Equation 1}$$

Unless explicitly specified otherwise herein, materials with k≤0.1 in the wavelength range are "transparent" materials, materials with k>0.1 and R≤0.6 in the specified wavelength range are "absorptive" materials, and materials with k>0.1 and R>0.6 in the specified wavelength range are "reflective" materials. If explicitly so stated in the claims, materials with k>0.1 and R≥0.7, R≥0.8, or R≥0.9, in the specified wavelength range, are "reflective" materials.

Unless explicitly noted otherwise herein, all temperature-dependent values are such values at 25° C.

DETAILED DESCRIPTION

As illustrated in FIG. 1, a wire grid polarizer (WGP) 10 is shown comprising an array of wires 12 on a face $11_F$ of a substrate 11 with channels 13 between adjacent wires 12. The array of wires 12 can be parallel and elongated. A pitch P of the wires 12 can be less than ½ of a lowest wavelength of a desired range of polarization (e.g. P<200 nm for polarization of visible light). Each wire 12 can include, or consist essentially of, the following layers moving outwards from the substrate 11: a high-index-layer HL, a low-index-layer LL, and a reflective-layer RL. The high-index-layer HL can have a high refractive index $n_H$ compared to a lower refractive index $n_L$ of the low-index-layer LL.

Following are example refractive index and extinction coefficient values and relationships, which can be such values or relationships across the ultraviolet spectrum, across the infrared spectrum, across the visible spectrum, or combinations thereof. The following refractive index and extinction coefficient values and relationships can be such values or relationships across part of the visible spectrum, such as at least 50 nm, at least 100 nm, or at least 150 nm of the visible spectrum.

The refractive index $n_H$ of the high-index-layer HL can be higher than the refractive index $n_L$ of the low-index-layer LL ($n_H > n_L$); an extinction coefficient $k_H$ of the high-index-layer HL can be higher than an extinction coefficient $k_L$ of the low-index-layer LL ($k_H > k_L$); or both. The refractive index $n_L$ of the low-index-layer LL can be lower than the refractive index $n_H$ of the high-index-layer HL ($n_L < n_H$); the extinction coefficient $k_L$ of the low-index-layer LL can be lower than the extinction coefficient $k_H$ of the high-index-layer HL ($k_L < k_H$); or both. For a reflective WGP, the extinction coefficient $k_H$ of the high-index-layer HL and the extinction coefficient $k_L$ of the low-index-layer LL can both be very small, such as for example $k_H \leq 0.01$ and $k_L \leq 0.01$.

The refractive index $n_H$ of the high-index-layer HL can be higher than a refractive index of any other layer in the wire. For example, the refractive index $n_H$ of the high-index-layer HL can be: $n_H \geq 1.7$, $n_H \geq 1.8$, $n_H \geq 1.9$, $n_H \geq 2$, $n_H \geq 2.1$, $n_H \geq 3$, or $n_H \geq 4$. In one embodiment, all layers in the wire, except for the high-index-layer HL, can have a refractive index<2 or <3.

The extinction coefficient $k_H$ of the high-index-layer HL can be ≤0.01 for a reflective WGP or ≥0.1 for an absorptive WGP. The extinction coefficient $k_L$ of the low-index-layer LL can be ≤0.01.

The extinction coefficient $k_R$ of the reflective-layer RL can be higher than an extinction coefficient of any other layer in the wire. The extinction coefficient $k_R$ of the reflective-layer RL can be higher than the extinction coefficient $k_H$ of the high-index-layer HL, higher than the extinction coefficient $k_L$ of the low-index-layer LL, or both ($k_R > k_H$, $k_R > k_L$, or both).

Following are example materials for each of these layers, whether they are categorized as reflective (R), absorptive (A), or transparent (T) in the visible spectrum, and their refractive index (n) and extinction coefficient (k) values:

| | layer | R, A, T | n, k 400 nm | n, k 550 nm | n, k 700 nm |
|---|---|---|---|---|---|
| titanium dioxide | HL | T | 2.3, 0 | 2.2, 0 | 2.1, 0 |
| silicon | HL | A | 5.6, 0.39 | 4.1, 0.04 | 3.8, 0.01 |
| germanium | HL | A | 4.7, 2.21 | 5.2, 2.20 | 5.0, 0.47 |
| silicon dioxide | LL | T | 1.5, 0 | 1.5, 0 | 1.5, 0 |
| aluminum | RL | R | 0.31, 3.8 | 0.59, 5.27 | 1.2, 6.64 |

Refractive index values listed are from https://refractiveindex.info/.

WGP 10 can be made as follows: The following layers can be applied on the substrate 11 in the following order, with thickness of each layer in parentheses: a titanium dioxide thin film (80 nm), a silicon dioxide thin film (80 nm), an aluminum thin film (80 nm), a silicon dioxide hard mask (290 nm), an aluminum hard mask (150 nm), then a layer of resist. Thickness of the layer of resist can vary depending on type of resist and method of lithography.

The layer of resist can be etched with fluorine, the aluminum hard mask can be etched with chlorine or bromine, the silicon dioxide hard mask can be etched with fluorine, the aluminum thin film can be etched with chlorine or bromine to form the reflective-layer RL, the silicon dioxide thin film can be etched with fluorine to form the low-index-layer LL, and the titanium dioxide thin film can be etched with chlorine or bromine to form the high-index-layer HL. At this stage of the etch process, the resist and the aluminum hard mask should be consumed, but likely there will still be some remaining silicon dioxide hard mask. Any remaining silicon dioxide hard mask can then be removed with fluorine. In addition to the above, a polymer film or oxygen can be used to passivate sidewalls of the wires 12.

Figure 2:
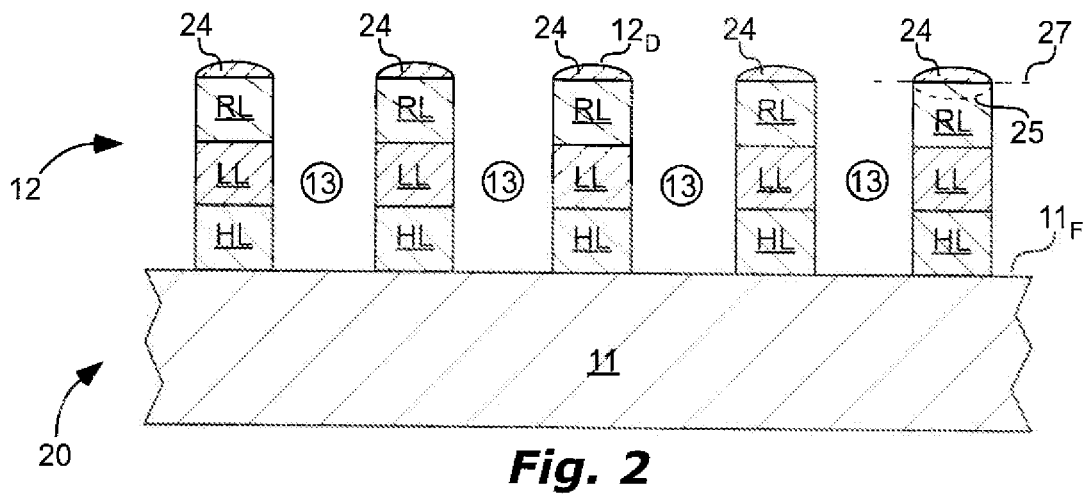
FIG. 2 is a schematic, cross-sectional side-view of WGP 20, similar to WGP 10, but WGP 20 further comprising a distal-end $12_D$ of each wire 12 having a convex shape, in accordance with an embodiment of the present invention.
Figure 3:
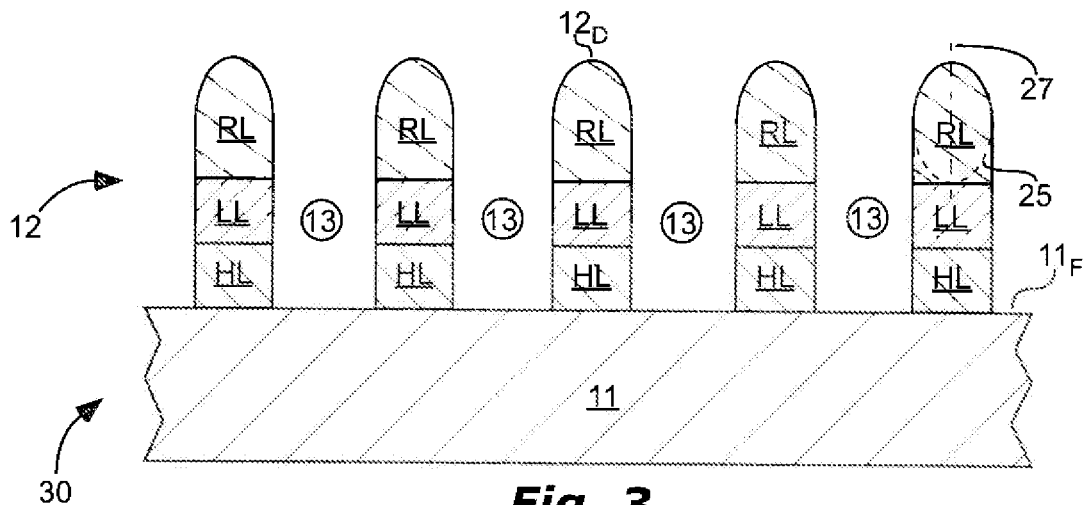
FIG. 3 is a schematic, cross-sectional side-view of WGP 30, similar to WGPs 10 and 20, except that the reflective-layer RL of WGP 20 is located at the distal-end $12_D$ of each wire 12 and reflective-layer RL has the convex shape, in accordance with an embodiment of the present invention.

WGPs 20 and 30, illustrated in FIGS. 2-3, are similar to WGP 10, but WGPs 20 and 30 further comprise a distal-end 12e of each wire 12 having a convex shape. As illustrated in FIG. 2, a top-layer 24 on the reflective-layer RL can have the convex shape. As illustrated in FIG. 3, the reflective-layer RL can be located at the distal-end $12_D$ of each wire 12, and the reflective-layer RL can have the convex shape. WGPs 20 and 30 can be made similar to WGP 10, except that the final fluorine etch, to remove remaining silicon dioxide, can be reduced or skipped, thus eliminating or reducing one etch step and reducing manufacturing cost.

The convex shape can be a half-circle or a half-elliptical shape. The other half of the elliptical shape is shown with line 25 in FIGS. 2-3. A major-axis 27 of the half elliptical shape can extend parallel to the face $11_F$ of the substrate 11, as illustrated in FIG. 2, or perpendicular to the face $11_F$ of the substrate 11, as illustrated in FIG. 3.

The half elliptical shape can have an eccentricity>0, ≥0.1, ≥0.25, ≥0.5, ≥0.75, or ≥0.9; and ≤0.6, ≤0.75, ≤0.9, ≤0.95, ≤0.97, ≤0.98, or <1.

For example, WGP 20 in FIG. 2 has a major-axis 27 of the half elliptical shape parallel to the face $11_F$ of the substrate 11 and eccentricity of about 0.91; and WGP 30 in FIG. 3 has a major-axis 27 of the half elliptical shape perpendicular to the face $11_F$ of the substrate 11 and eccentricity of about 0.76.

If the top-layer 24 has the convex shape, as illustrated in FIG. 2, then it may be preferable for the reflective-layer RL to have a rectangular shape (e.g. minimal or no etch into sides of the reflective-layer RL). This can be achieved by use of anisotropic etch, use of a thicker top-layer 24 or hard mask above the top-layer 24, reduced etch time, higher etch bias power, lower etch chamber pressure, or combinations thereof. Furthermore, higher etch selectivity between the top-layer 24 and the reflective-layer RL can help to achieve this.

Furthermore, if the top-layer 24 is transparent, and has the convex shape, then such convex shape can be adjusted along with thickness of the top-layer 24 for improved WGP performance, especially increased transmission of a desired polarization (e.g. increased Tp) and reduced variation in reflection of the opposite polarization (e.g. Rs). Preferred shape of the convex shape of the top-layer 24 depends on overall WGP structure and wavelength range; however, it is generally preferable for the major-axis 27 of the half elliptical shape of the convex shape to extend parallel to the face $11_F$ of the substrate 11, as illustrated in FIG. 2, if this can be manufactured without etching into sides of the reflective-layer RL. Generally, a more anisotropic etch, combined with higher etch selectivity between the top-layer 24 and the reflective-layer RL, can be used to achieve this. The top-layer 24 can be a remaining portion of the hard mask, or material of the top-layer 24 can be sandwiched between the hard mask and the reflective-layer RL.

Depending on use of the WGP and material and thickness of the top-layer 24, it may be preferable for the convex shape of the top-layer 24 to have a half circle shape or for the major-axis 27 of the half elliptical shape of the convex shape of the top-layer 24 to extend perpendicular to the face $11_F$ of the substrate 11. This shape can provide better protection to the high-index-layer HL, the low-index-layer LL, and to the reflective-layer RL. To form such a structure, a thicker layer of material for the top-layer 24 may be applied along with using an etch with less anisotropic character.

If the reflective-layer RL has the convex shape, as illustrated in FIG. 3, transmission of a desired polarization (e.g. increased Tp) can be achieved if the major-axis 27 of the half elliptical shape of the convex shape extends perpendicular to the face $11_F$ of the substrate 11. This can be achieved by use of a thinner hard mask, decrease of bias power, increased chamber pressure, and less selectivity of the etch chemistry between the hard mask and material of the reflective-layer RL.

If the reflective-layer RL has the convex shape, but low transmission of the opposite polarization (e.g. low Ts) and high contrast (e.g. high Tp/Ts) are preferred over high Tp, then the major-axis 27 of the half elliptical shape of the convex shape can extend parallel to the face $11_F$ of the substrate 11. This can be achieved by the following, relative to the etch of the prior paragraph: a thicker hard mask, increase of bias power, decreased chamber pressure, and increased selectivity of the etch chemistry between the hard mask and material of the reflective-layer RL.

Thus in WGP 30, in which the reflective-layer RL has the convex shape, there is a tradeoff between high Tp (major-axis 27 perpendicular to the face $11_F$) and low Ts (major-axis 27 parallel to the face $11_F$). Each WGP can thus be adjusted for increased Tp or reduced Ts, depending on which is most useful for the specific application.

WGP 30 can have higher Tp than WGPs 10 and 20; but WGPs 10 and 20 can have higher contrast (Tp/Ts) than WGP 30. WGP 10 can have improved Rs over WGPs 20 and 30. WGPs 20 and 30 can be easier to manufacture than WGP 10. For each WGP application, a different combination of Tp, Ts, Rs, and cost is preferred.

WGPs 10, 20, and 30 can have high Rs, if the high-index-layer HL is transparent (e.g. titanium dioxide), or can have low Rs, if the high-index-layer HL is absorptive (e.g. silicon or germanium). Furthermore, such Rs can be stable with minimal variation of Rs from wafer to wafer, or within a wafer. This improvement of Rs results from a combination of multiple of the following factors: the order of layers in the wire 12, specific materials of the layers, specific refractive indices of the layers, specific extinction coefficients of the layers, limiting to only a few such layers in each wire 12 (e.g. three layers, four layers, or five layers), the convex shape at the distal-end $12_D$ of each wire 12, and a rectangular cross-sectional shape of the high-index-layer HL and the low-index-layer LL. It is the synergistic combination of these factors that provides improved and consistent Rs.

The high-index-layer HL and the low-index-layer LL can each have a rectangular cross-sectional shape, as illustrated in FIGS. 1-3. Manufacture of the WGP with the high-index-layer HL and the low-index-layer LL having a rectangular cross-sectional shape is especially useful for reducing variation of Rs between manufactured wafers, or even within each wafer. This can be achieved by sandwiching the high-index-layer HL and the low-index-layer LL between the substrate 11 and the reflective-layer RL, thus protecting the high-index-layer HL and the low-index-layer LL during etch, then locating the light source 41 such that it faces the substrate 11 instead of facing the wires 12, as described in the following paragraph.

Figure 4:
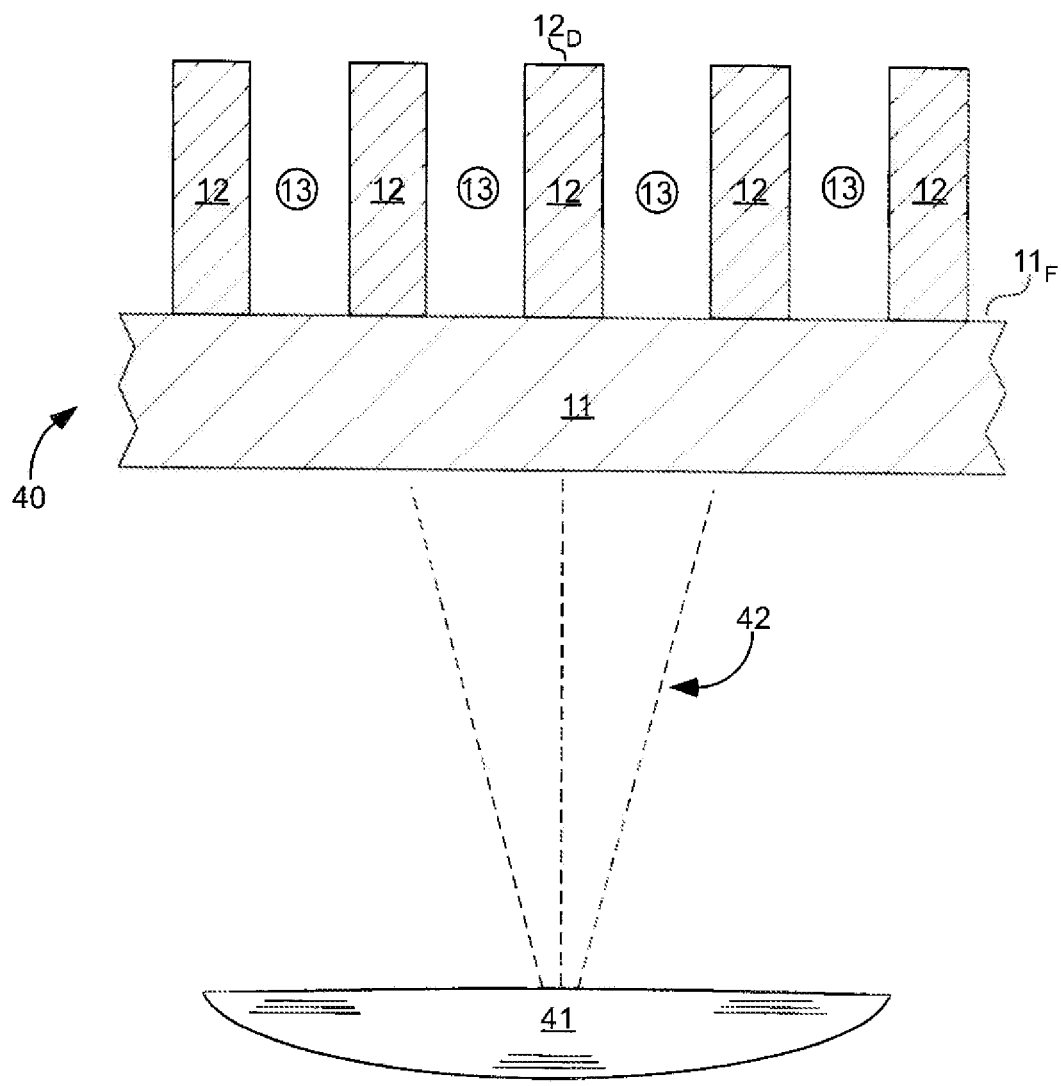
FIG. 4 is a schematic view of method of using a WGP 40 to polarize light, the method including emitting a light beam 42, from a light source 41, to the WGP 40, the substrate 11 of the WGP 40 facing the light source 41, in accordance with an embodiment of the present invention.

Illustrated in FIG. 4 is a method of using a WGP 40, including emitting a light beam 42 to the WGP 40, from a light source 41, with the substrate 11 of the WGP 40 facing the light source 41. WGP 40 can be any of the WGPs described herein. Although in prior art WGPs, the wires normally face the light source, for minimal variation of Rs, it is preferred to use the WGPs herein with the substrate 11 facing the light source 41.

What is claimed is:
1. A wire grid polarizer (WGP) comprising:
an array of wires on a face of a substrate with channels between adjacent wires;
each wire of the array of wires having a distal-end farthest from the substrate, the distal-end having a convex shape;
each wire of the array of wires including the following layers moving outwards from the substrate: a high-index-layer, a low-index-layer, and a reflective-lyer;
a refractive index of the high-index-layer is higher than a refractive index of the low-index-layer across the visible spectrum;
the refractive index of the high-index-layer is higher than a refractive index of any other layer in the wire of the array of wires across the visible spectrum; and the convex shape of the distal-end of each wire of the array of wires has a half elliptical shape with a major-axis of the half elliptical shape extending perpendicular to the face of the substrate and an eccentricity ≥0.6 and ≤0.98.

2. The WGP of claim 1, wherein the reflective-layer is located at the distal-end of each wire of the array of wires.

3. The WGP of claim 1, wherein across the visible spectrum: an extinction coefficient of the reflective-layer is higher than an extinction coefficient of any other layer in the wire of the array of wires.

4. The WGP if claim 1, wherein each wire of the array of wires consists essentially of the high-index-layer, the low-index-layer, and the reflective-layer.

5. The WGP of claim 1, wherein the high-index-layer and the low-index-layer each have a rectangular cross-sectional shape.

6. A method of using the WGP of claim 1 to polarize light, the method including emitting a light beam, from a light source, to the WGP, the substrate facing the light source.

7. The WGP of claim 1, wherein across the visible spectrum: the refractive index of the high-index-layer is ≥1.8, an extinction coefficient of the high-index-lyer is ≤0.01, and an extinction coefficient of the low-index-layer is ≤0.01.

8. The WGP of claim 7, wherein across the visible spectrum, the refractive index of any other layer in the wire of the array of wires, except for the high-index-layer, is <2.

9. The WGP of claim 1, further comprising a top-layer on the reflective-layer, and the top-layer has the convex shape.

10. The WGP of claim 9, wherein the reflective-layer has a rectangular shape.

11. A wire grid polarizer (WGP) comprising:
an array of wires on a face of a substrate with channels between adjacent wires;
each wire of the array of wires having a distal-end farthest from the substrate, the distal-end having a convex shape;
each wire of the array of wires including the following layers moving outwards from the substrate; a high-index-layer, a low-index-layer, and a reflective-layer;
a refractive index of the high-index-layer is higher than a refractive index of the low-index-layer across the visible spectrum;
the refractive index of the high-index-layer is higher than a refractive index of any other layer in the wire of the array of wires across the visible spectrum; and
the convex shape of the distal-end of each wire of the array of wires has a half elliptical shape with a major-axis of the half elliptical shape extending parallel to the face of the substrate and an eccentricity ≥0.6 and ≤0.98.

12. A method of using the WGP of claim 11 to polarize light, the method including emitting a light beam, from a light source, to the WGP, the substrate facing the light source.

13. The WGP of claim 11, wherein the reflective-layer is located at the distal-end of each wire of the array of wires.

14. The WGP of claim 11, wherein across the visible spectrum: an extinction coefficient of the reflective-layer is higher than an extinction coefficient of any other layer in the wire of the array of wires.

15. The WGP of claim 11, wherein across the visible spectrum: the. refractive index of the high-index-layer is ≥2, an extinction coefficient of the high-index-layer is ≤0.01, and an extinction coefficient of the low-index-layer is ≤0.01.

16. The WGP of claim 11, wherein each wire of the array of wires consists essentially of the high-index-layer, the low-index-layer, and the reflective-layer.

17. The WGP of claim 11, further comprising a top-layer on the reflective-layer, and the top-layer has the convex shape.

18. The WGP of claim 16, wherein the reflective-layer, the high-index-layer, and the low-index-layer each have a rectangular cross-sectional shape.

19. The WGP of claim 11, wherein $k_H \leq 0.1$, $k_R > k_H$, and $k_R > k_L$ across the visible spectrum, where $k_R$ is an extinction coefficient of the reflective-layer, $k_H$ is an extinction coefficient of the high-index-layer, and $k_L$ is an extinction coefficient of the low-index-layer.

20. The WGP of claim 11, wherein across the visible spectrum the high-index-layer is transparent.

* * * * *